(12) United States Patent
Frankel

(10) Patent No.: US 7,343,008 B1
(45) Date of Patent: *Mar. 11, 2008

(54) IDENTITY-BASED CONFERENCING SYSTEMS AND METHODS

(76) Inventor: David P. Frankel, 16785 Magneson Loop, Los Gatos, CA (US) 95032

( * ) Notice: Subject to any disclaimer, the term of this patent is extended or adjusted under 35 U.S.C. 154(b) by 0 days.

This patent is subject to a terminal disclaimer.

(21) Appl. No.: 11/772,945

(22) Filed: Jul. 3, 2007

Related U.S. Application Data

(63) Continuation of application No. 11/738,917, filed on Apr. 23, 2007.

(51) Int. Cl.
*H04M 3/42* (2006.01)

(52) U.S. Cl. ............... 379/202.01; 379/204.01; 379/205.01; 379/206.01; 379/207.01; 379/207.02; 379/207.03; 379/207.11; 379/207.15; 379/142.01; 379/142.04; 379/142.06; 370/260; 709/204

(58) Field of Classification Search ......... 379/202.01, 379/204.01, 205.01, 206.01, 207.01, 207.02, 379/207.03, 207.11, 207.15, 142.01, 142.04, 379/142.06; 370/260; 709/204
See application file for complete search history.

(56) References Cited

U.S. PATENT DOCUMENTS

| | | | |
|---|---|---|---|
| 3,555,190 A | 1/1971 | Braun | |
| 3,882,276 A | 5/1975 | Feiner et al. | |
| 4,600,814 A | 7/1986 | Cunniff et al. | |
| 4,605,823 A | 8/1986 | Sudo et al. | |
| 4,782,517 A | 11/1988 | Bernardis et al. | |
| 4,788,720 A | 11/1988 | Brennan et al. | |
| 4,813,070 A | 3/1989 | Humphreys et al. | |
| 4,878,240 A | 10/1989 | Lin et al. | |
| 4,961,211 A | 10/1990 | Tsugane et al. | |
| 5,136,581 A | 8/1992 | Muehrcke | |
| 5,222,120 A | 6/1993 | McLeod et al. | |
| 5,369,694 A | 11/1994 | Bales et al. | |
| 5,408,526 A | 4/1995 | McFarland et al. | |
| 5,450,481 A | 9/1995 | Penzias | |
| 5,483,588 A | 1/1996 | Eaton et al. | |
| 5,502,762 A | 3/1996 | Andrew et al. | |
| 5,583,925 A * | 12/1996 | Bernstein | 379/202.01 |

(Continued)

FOREIGN PATENT DOCUMENTS

EP  0 585 480  3/1994

(Continued)

OTHER PUBLICATIONS

Baudin, et al.; "Supporting Distributed Experts In E-meetings for Synchronous Collaboration"; IEEE International Conference on Systems, Man and Cybernetics; Oct. 6-9, 2002; pp. 1-7.

(Continued)

*Primary Examiner*—Quynh H. Nguyen

(57) ABSTRACT

Described in this paper are systems and methods of providing conferencing services where a conference participant is identified by the conferencing system when calling into the system. The system and methods focus on individual users instead of groups of participants. Instead of using a conference identity as the driver, embodiments herein invoke a user identity, and services are personalized for each user. The user has far fewer codes to juggle and all participants enjoy a quicker, richer, and more secure experience.

14 Claims, 8 Drawing Sheets

U.S. PATENT DOCUMENTS

| | | | |
|---|---|---|---|
| 5,619,555 A | 4/1997 | Fenton et al. |
| 5,644,629 A | 7/1997 | Chow |
| 5,768,356 A | 6/1998 | McKendry et al. |
| 5,848,132 A | 12/1998 | Morley et al. |
| 5,859,904 A | 1/1999 | Huang |
| 5,889,945 A | 3/1999 | Porter et al. |
| 6,005,870 A | 12/1999 | Leung et al. |
| 6,023,499 A | 2/2000 | Mansey et al. |
| 6,088,435 A | 7/2000 | Barber et al. |
| 6,189,034 B1 | 2/2001 | Riddle |
| 6,272,214 B1 | 8/2001 | Jonsson |
| 6,282,278 B1 | 8/2001 | Nezihi et al. |
| 6,324,273 B1 | 11/2001 | Alcott |
| 6,330,320 B1 | 12/2001 | Cornell et al. |
| 6,411,605 B1 | 6/2002 | Vance et al. |
| 6,418,214 B1 | 7/2002 | Smythe et al. |
| 6,463,038 B1 | 10/2002 | Wilson |
| 6,621,895 B1 | 9/2003 | Giese |
| 6,668,048 B1 | 12/2003 | Suga et al. |
| 6,728,784 B1 | 4/2004 | Mattaway |
| 6,754,323 B1 | 6/2004 | Chang et al. |
| 6,768,722 B1 | 7/2004 | Katseff et al. |
| 6,798,753 B1 | 9/2004 | Doganata et al. |
| 6,807,563 B1 | 10/2004 | Christofferson et al. |
| 6,816,469 B1 | 11/2004 | Kung et al. |
| 6,853,714 B2 | 2/2005 | Liljestrand et al. |
| 6,885,740 B2 | 4/2005 | Ernstrom et al. |
| 6,898,273 B2 | 5/2005 | Ernstrom et al. |
| 6,996,221 B1 | 2/2006 | Baiyor et al. |
| 6,999,570 B2 | 2/2006 | Alcott |
| 7,006,617 B1 | 2/2006 | Farra et al. |
| 7,130,393 B2 | 10/2006 | Hall et al. |
| 7,133,512 B2 | 11/2006 | Creamer et al. |
| 7,139,249 B2 | 11/2006 | Norris et al. |
| 7,155,480 B2 | 12/2006 | Byrisetty et al. |
| 7,167,552 B1 | 1/2007 | Shaffer et al. |
| 7,184,531 B2 | 2/2007 | Crouch |
| 7,187,762 B2 | 3/2007 | Celi, Jr. et al. |
| 7,200,213 B2 | 4/2007 | Morris |
| 7,209,947 B1 | 4/2007 | Lee et al. |
| 7,212,500 B2 | 5/2007 | Motobayashi et al. |
| 7,215,647 B2 | 5/2007 | Wilson |
| 2001/0038689 A1 | 11/2001 | Liljestrand et al. |
| 2001/0046284 A1 | 11/2001 | Alcott |
| 2002/0071540 A1 | 6/2002 | Dworkin |
| 2002/0136382 A1 | 9/2002 | Cohen et al. |
| 2003/0026407 A1 | 2/2003 | Ernstrom et al. |
| 2003/0156697 A1 | 8/2003 | Svercek |
| 2003/0194072 A1 | 10/2003 | MacNamara et al. |
| 2005/0152521 A1 | 7/2005 | Liljestrand |
| 2005/0169450 A1 | 8/2005 | Blin et al. |
| 2005/0265537 A1 | 12/2005 | Verbil et al. |
| 2005/0276406 A1 | 12/2005 | Keohane et al. |
| 2007/0011239 A1 | 1/2007 | Fujioka |
| 2007/0116227 A1 | 5/2007 | Vitenson et al. |
| 2007/0121530 A1* | 5/2007 | Vadlakonda et al. ........ 370/260 |
| 2007/0133438 A1* | 6/2007 | Shaffer et al. .............. 370/260 |

FOREIGN PATENT DOCUMENTS

| | | |
|---|---|---|
| GB | 2367711 | 4/2002 |
| GB | 2399711 | 9/2004 |
| JP | 1264463 | 10/1989 |

OTHER PUBLICATIONS

Buchorn, et al.; "Vid-Mid Videoconferencing Workplan Scenarios for Videoconferencing"; Jan. 25, 2002; pp. 1-7.

Online demo of Web*Office*; "System Properties and Preferences"; May 8, 2002; pp. 1-15.

* cited by examiner

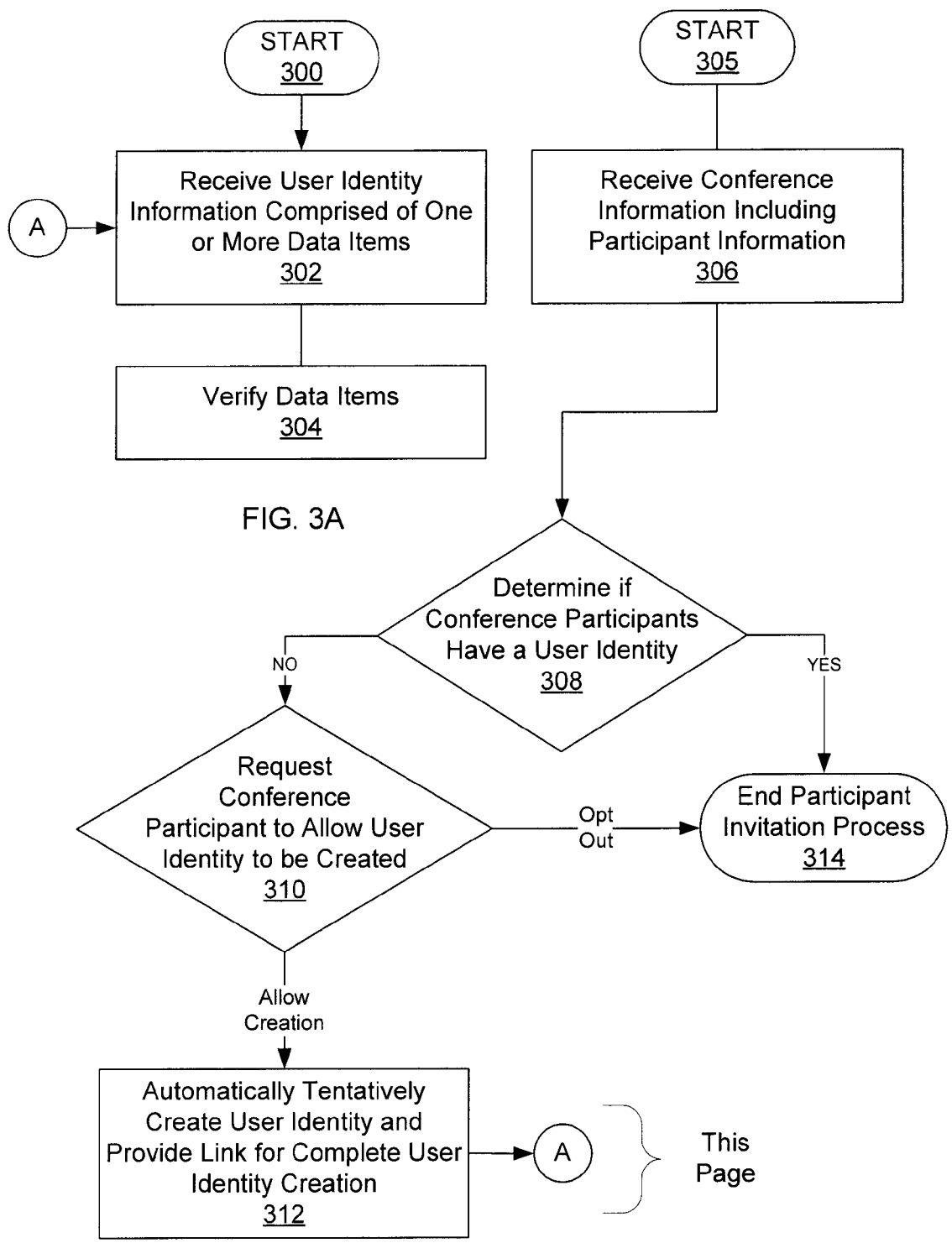

Table: UserList

| UserIndex | Name | Company | Password | UserCode | SpokenName |
|---|---|---|---|---|---|
| 001 | David Frankel | Telethought | 4567 | 3726535 | UserRec001 |
| 002 | Fred Smith | Acme | 3232 | 8680606 | UserRec002 |
| 003 | Dawn Jackson | Superior | 1090 | 4088841 | UserRec003 |

FIG. 4A

Table: TelNumbers

| Number | User Index |
|---|---|
| 408-555-1445 | 001 |
| 312-555-1469 | 002 |
| 408-555-5396 | 001 |
| 212-555-6535 | 003 |
| 612-555-9240 | 003 |

FIG. 4B

Table: EmailAddrs

| EmailIndex | EmailAddress | UserIndex |
|---|---|---|
| 17 | fsmith@acme.com | 002 |
| 18 | dfrankel@telethought.com | 001 |
| 19 | davidf@yahoo.com | 001 |
| 20 | dawn@superior.com | 003 |

FIG. 4C

Table: Conferences

| ConfIndex | StartTime | Duration | Description | HostUserIndex | ConfCode |
|---|---|---|---|---|---|
| 1345 | 11-Dec-07 13:30 | 90 | Staff Meeting | 002 | 669432 |
| 6029 | 15-Dec-07 08:00 | 45 | Budget Review | 003 | 234987 |
| 3388 | 15-Dec-07 08:30 | 60 | Sales Briefing | 002 | |

FIG. 4D

Table: Participants

| EmailIndex | ConfIndex |
|---|---|
| 17 | 3338 |
| 18 | 6029 |
| 20 | 6029 |
| 17 | 1345 |
| 18 | 1345 |
| 19 | 3388 |

FIG. 4E

IDENTITY-BASED CONFERENCING SYSTEMS AND METHODS

CROSS-REFERENCE TO RELATED APPLICATION

This application is a continuation of U.S. patent application Ser. No. 11/738,917 filed on Apr. 23, 2007, which is fully incorporated herein by reference and made a part hereof.

BACKGROUND

1. Field of the Invention

This invention relates generally to conferencing and more particularly to systems and methods of audio teleconferencing. Even more particularly, embodiments according to the present invention relate to audio conferencing via telephone and computer, using the traditional plain old telephone system (POTS) and/or Internet-based connections.

2. Background

Conference calling has been offered as a telecommunications service for some time. As prices have dropped it has become increasingly popular and is now used by businesses and some consumers on a regular basis for local, national, and global virtual meetings. Participants typically dial into a conference "bridge"—a specialized system either within the telephone network or connected to it. Modern bridges can support large numbers of callers segregated into multiple conferences. The participants enter digits via the telephone dial pad to identify the conference they wish to join. Once established, the system computes and sends to each participant the merged audio of the other participants.

In addition to connections over the conventional telephone network (i.e., public—switched telephone network (PSTN or POTS), an increasing number of "telephone calls" are made over the Internet. These calls are made with special Internet telephones, with adapters that interface traditional phones to the Internet, or with Internet-connected personal computers augmented with headsets and special software. Often these endpoints are able to dial traditional telephone network numbers, in which case they usually can be used to access the conference bridges just described, again sending DTMF digits to enter a particular conference.

Some conference systems offer a "dial out" capability, rather than requiring each participant to dial in. In this case, for a given conference, the organizer enters into the system a list of participant telephone numbers, and the system calls each one. Once a connection is made, the participant is added to the conference.

Today, most conference systems are completely automated, but early systems required an operator. The operator would greet each caller and ask for the caller's name and the name of the conference they wished to join. After checking an attendee list, the operator would announce the new participant and place the caller into the desired conference.

Earlier conferencing systems also often used call bridging hardware of limited capacity. Facilities had to be reserved in advance, and a given bridging resource would often have a specific access telephone number assigned to it, which all participants would dial. An additional "access code" would be issued to restrict the bridge to only those callers that could provide the correct code, which would change each time a new conference session was initiated.

Modern automated conference systems typically have a large pool of bridging resources accessed by a single telephone number. The systems assign conference ID codes when a conference is scheduled, usually via a Web interface. Many systems allow individual users to sign up for a unique, permanent ID code, which becomes their personal "conference room." An individual planning to host a conference need only distribute his code to the invited participants and tell them to call in at a specified time. This information is most frequently distributed via electronic mail (E-mail). Participants in a particular conference then dial into the bridge concurrently and enter the same ID code to get placed into a common conference. This is convenient for someone that hosts conferences frequently; they need only memorize their specific code. However, for an individual who attends many conferences with different hosts, they must be sure to use the right code for the specific conference at the appropriate time.

While conferencing systems have become increasingly automated and feature-rich, they generally still require access codes entered by the participants. As noted, some systems use these codes to identify which conference the caller wishes to enter; others use them to authenticate the caller (making sure that only authorized parties gain access to the conference), and sometimes the codes serve multiple purposes. Codes are often misplaced, forgotten, or entered incorrectly, and individuals that participate in several conferences per day or week are routinely frustrated trying to manage the information specific to each conference.

U.S. Pat. No. 6,330,320, issued to Cornell, et al. on Dec. 11, 2001 suggests an approach where a conferencing system is provided by a carrier (e.g., AT&T) within the carrier's network (i.e., "in network"). The conference organizer (host) provides the conferencing network, in advance, with additional information about a conference. The information provided by the organizer can be used to authenticate the participants, relieving them of the obligation to enter a conference access code. The advance information is also used to route the call to the appropriate bridge location within the network. In addition to the conferencing system being incorporated within a carrier's network, the conferencing invention described in the '320 patent has no knowledge of the conference schedule and does not reconcile calls from participants invited to several different conferences.

In their Patent Application 2005/0276406, Keohane et al. describe a system that allows a conference organizer to register with a conferencing system a list of participants and their phone numbers and establish a schedule for calling them into a conference. This approach also can obviate the need for participants to remember access codes. However, it requires that each participant "register" with the conference system for each conference call in advance in order to realize the benefits of the invention; those that do not register and instead dial into the conference must still manage access codes. Similarly to Cornell et al., it does not provide for reconciliation of participants invited to participate in a plurality of conference calls that overlap or occur concurrently.

Therefore, what is needed are conferencing systems and methods that overcome challenges present in the art, some of which are described above.

SUMMARY OF THE INVENTION

Embodiments according to the present invention provide methods and a system for conferencing among two or more conference participants. Embodiments according to the invention provide for conferencing that focuses on individual users instead of groups of participants. Instead of using a conference identity as the driver, embodiments herein invoke a user identity, and services are personalized for each user. The user has far fewer codes to juggle and all participants enjoy a quicker, richer, and more secure experience.

In one aspect according to the present invention a method of conferencing is provided. The method comprises a conferencing system configured to concurrently host a plurality of conferences receiving one or more user identities. Each of the user identities includes one or more data items that identify a user. Conference information is also received by the conferencing system. The conference information includes at least one of the data items for each conference participant and an anticipated start time for the conference. A call is received by the conferencing system from a prospective conference participant and a caller identifier is determined for the prospective conference participant from call data. The caller identifier is compared to the data items in each user identity to identify the prospective conference participant. The caller identifier or the data items of an identified prospective conference participant are compared to the to the conference data to determine one or more of the plurality of conferences in which the identified prospective conference participant is invited to participate. Each conference that is scheduled to be active proximate to a time the call is received is selected from the one or more conferences in which the prospective conference participant is invited to participate. If there is only one conference scheduled to be active proximate to the call time, then the identified prospective conference participant is placed in the conference or given an option to join the conference, else if there are more that one conference scheduled to be active proximate to the call time then the conference participant is provided information about each of the one or more plurality of conferences proximate to the call time in which the prospective conference participant is invited to participate. A choice is received from the prospective conference participant of one of the plurality of conferences proximate to the call time in which the prospective conference participant is invited to participate, and the prospective conference participant is placed in the chosen conference.

In one aspect the data items that identify a user can comprise one or more E-mail addresses or one or more telephone numbers.

In one aspect, the caller identifier is determined by caller ID or ANI.

In yet another aspect according to the present invention, a system is provided for providing conferencing services. The system comprises a memory configured for storing data related to a plurality of users and a plurality of conferences and a processor, coupled to the memory. The processor is configured for performing the steps comprising:

Receiving by a conferencing system configured to concurrently host a plurality of conferences, one or more user identities Each identity includes one or more data items that identify a user.

Receiving by the conferencing system, conference information. The conference information includes at least one of the data items for each conference participant and an anticipated start time for the conference.

Receiving at a present time a call from a prospective conference participant and determining a caller identifier for the prospective conference participant from call data. Comparing the caller identifier to the data items in each user identity to identify the prospective conference participant.

Comparing the caller identifier or the data items of an identified prospective conference participant to the conference data to determine one or more of the plurality of conferences in which the identified prospective conference participant is invited to participate.

Selecting from the one or more conferences in which the prospective conference participant is invited to participate each conference that is scheduled to be active proximate to the present time.

If there is only one conference scheduled to be active proximate to the present time, then placing the identified prospective conference participant in the conference or giving the participant an option to join the conference, else if there are more that one conference scheduled to be active proximate to the present time then; providing information to said conference participant about each of the one or more of the plurality of conferences proximate to the present time in which the prospective conference participant is invited to participate, wherein the information includes the conference identifier; receiving from the prospective conference participant a choice of one of the one or more plurality of conferences proximate to the present time in which the prospective conference participant is invited to participate, wherein the choice is based on the information; and placing the prospective conference participant in the chosen conference.

Another aspect according to the present invention is computer program product for providing conference services. The computer program product comprises at least one computer-readable storage medium having computer-readable program code portions stored therein. The computer-readable program code portions comprise a first executable portion for receiving by a conferencing system configured to concurrently host a plurality of conferences one or more user identities. The user identity includes one or more data items that identify a user. The computer-readable program code portions further comprise a second executable portion for receiving by said conferencing system conference information. The conference information includes at least one of the data items for each conference participant and an anticipated start time for the conference. The computer-readable program code portions further comprise a third executable portion for receiving a call from a prospective conference participant and determining a caller identifier for the prospective conference participant from call data. The caller identifier is compared to the data items in each user identity to identify the prospective conference participant. The caller identifier or the data items of an identified prospective conference participant are compared to the conference data to determine one or more of the plurality of conferences in which the identified prospective conference participant is invited to participate. Each conference that is scheduled to be active proximate to a time the call is received is selected from the one or more conferences in which the prospective conference participant is invited to participate. A fourth executable portion comprises determining if there is only one conference scheduled to be active proximate to the call time, then placing the identified prospective conference participant in the conference or giving the participant an option of joining the conference, else if there are more that one conference scheduled to be active proximate to the call time then; providing information to the conference participant about each of the plurality of conferences proximate to the call time in which the prospective conference participant is invited to participate, receiving from the prospective conference participant a choice of one of the plurality of conferences proximate to the call time in which the prospective conference participant is invited to participate, wherein the choice is based on the information, and placing the prospective conference participant in the chosen conference.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, not drawn to scale, which are incorporated in and constitute a part of this specification, illustrate embodiment(s) of the invention and together with the description, serve to explain the principles of the invention:

FIG. 3A illustrates an exemplary process for establishing a user identity in by an embodiment of the conferencing system according to the present invention;

FIG. 3B illustrates an exemplary process for inviting participants to join in a conference in an embodiment of the conferencing system according to the present invention;

FIGS. 4A-4E illustrate an exemplary database structure according to an embodiment of the present invention.

DESCRIPTION OF THE PREFERRED EMBODIMENTS

Figure 1A:
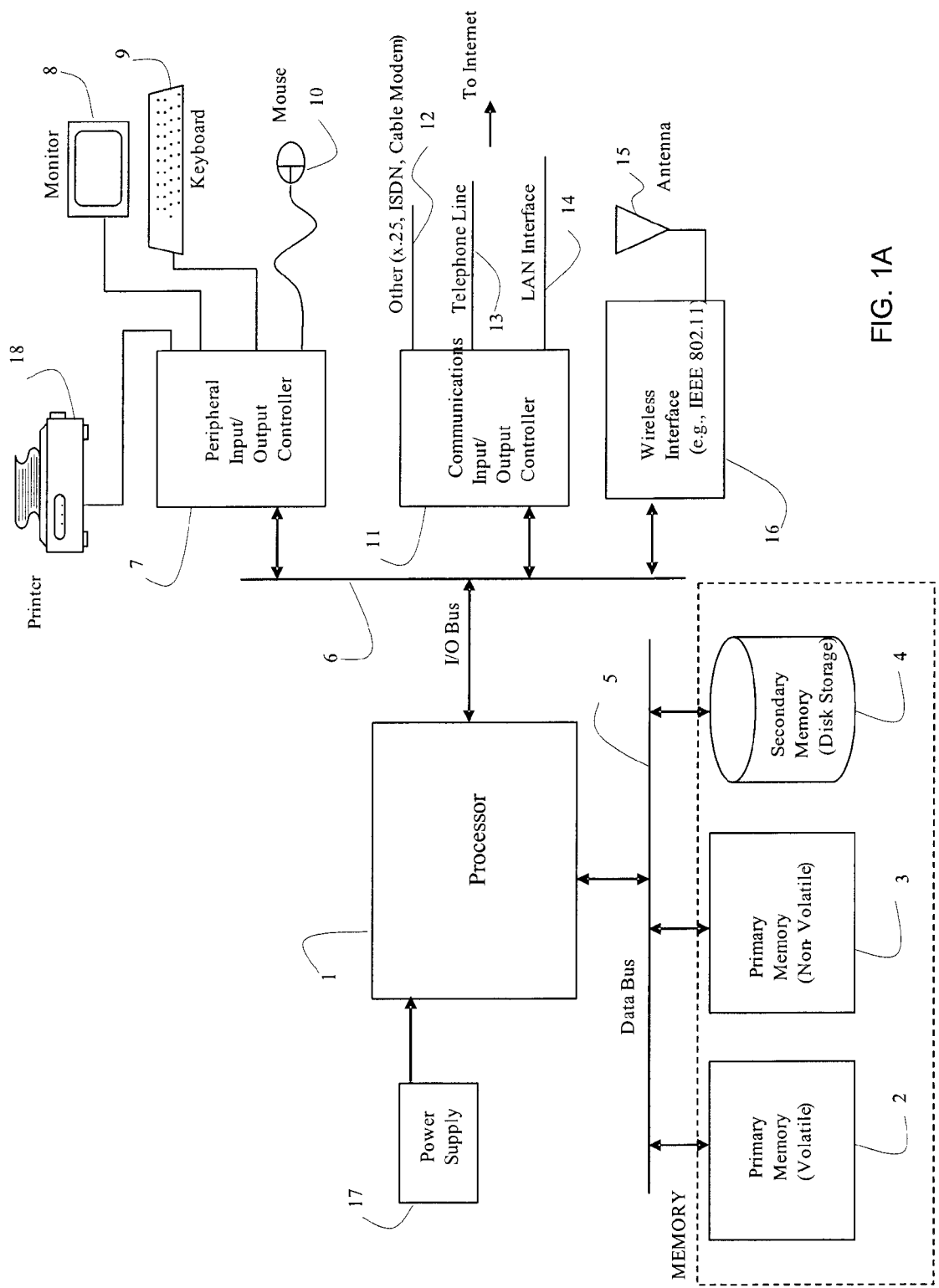
FIG. 1A is an exemplary computing device that can be used to practice aspects of the preferred embodiment.

The present invention may be understood more readily by reference to the following detailed description of preferred embodiments of the invention and the Examples included therein and to the Figures and their previous and following description.

As used in the specification and the appended claims, the singular forms "a," "an" and "the" include plural referents unless the context clearly dictates otherwise. Thus, for example, reference to "a" or "an" endpoint device may include two or more endpoint devices.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims which follow, reference will be made to a number of terms which shall be defined to have the following meanings: "Optional" or "optionally" means that the subsequently described event or circumstance may or may not occur, and that the description includes instances where said event or circumstance occurs and instances where it does not.

Reference will now be made in detail to the present embodiments according to the invention, examples of which are illustrated in the accompanying drawings. Wherever possible, the same reference numbers are used throughout the drawings to refer to the same or like parts.

As will be appreciated by one skilled in the art, the preferred embodiment or aspects of the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment or aspects of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, magnetic storage devices, etc.

The preferred embodiments according to the present invention are described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus, such as the ones described below, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the preferred embodiments referenced herein, a "computer," "computing device," "controller," or "server" may be referenced. Such computer may be, for example, a mainframe, desktop, notebook or laptop, a hand held device such as a data acquisition and storage device, or it may be a processing device embodied within another apparatus such as, for example, a processor incorporated into telephonic system such as a private branch exchange (PBX) system or network devices having processors. In some instances the computer may be a "dumb" terminal used to access data or processors over a network such as the Internet. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
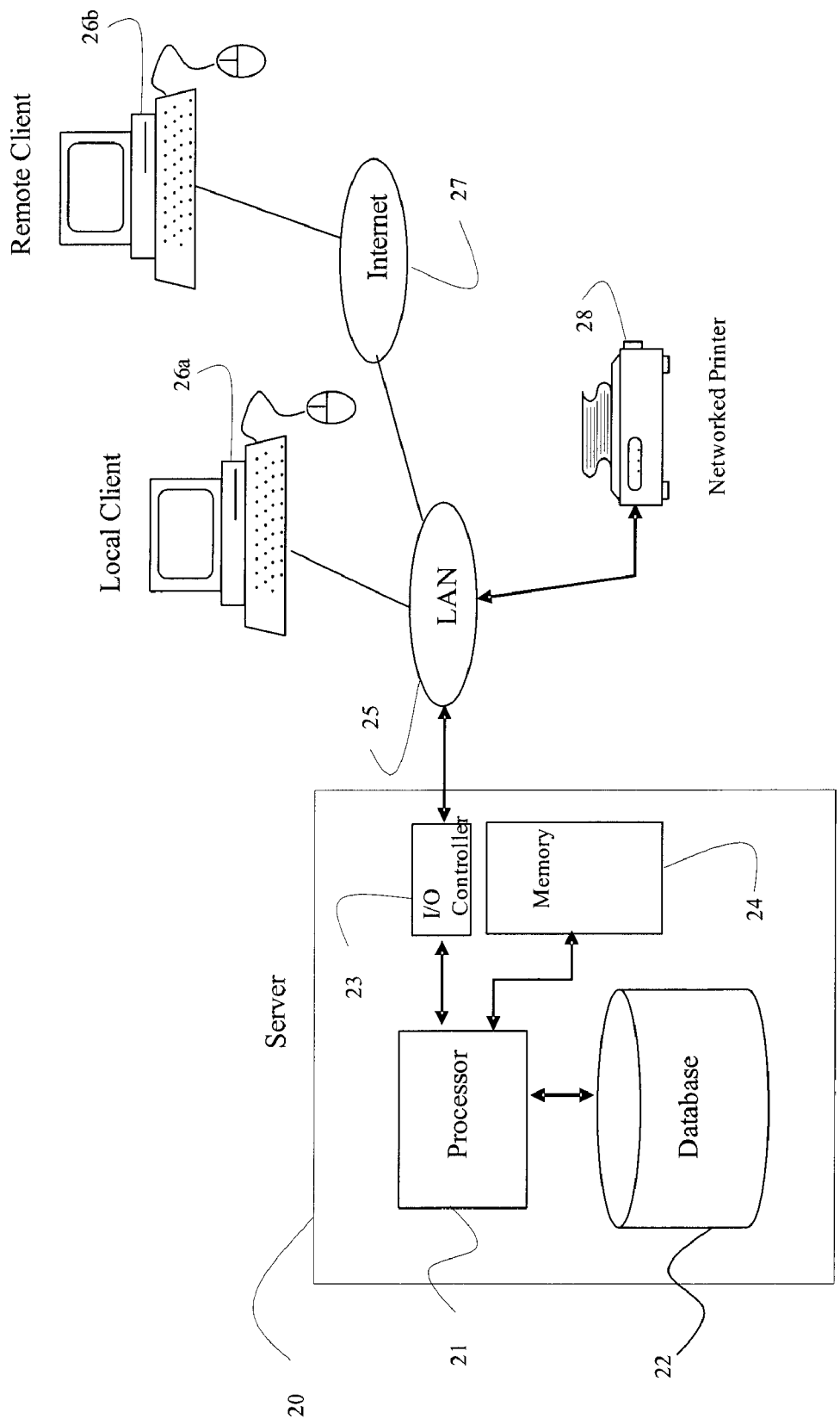
FIG. 1B is an alternative embodiment of a processing system of that shown in FIG. 1A that may be used in embodiments according to the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 1A and 1B can be modified in different ways and be within the scope of the present invention as claimed.

OVERVIEW

Embodiments according to the invention described herein provide a conference system that focuses on individual users instead of groups of participants. Instead of using a conference identity as the driver, embodiments herein invoke a user identity, and services are personalized for each user. The user has far fewer codes to juggle and all participants enjoy a quicker, richer, and more secure experience.

Potential conference participants register as a user of an embodiment according to the system described herein. In creating a user identity, via a Web interface, an embodiment of the system learns the user's name, E-mail address(es), telephone number(s), and other preferences including a user code of their choosing. Optionally, an audio recording of the user's name can be made.

When a conference is scheduled, an organizer (host) provides an embodiment of the system the conference time and participant list. In one aspect, this can be accomplished by including an E-mail address associated with the conferencing system as a "carbon copy" recipient of the E-mail notification going to the participants. The conference system examines the E-mail message to automatically extract the date and time of the conference and infers the participant list from the addressees on the E-mail. This process is facilitated by the widespread use of standard calendaring systems such as, for example, Microsoft Outlook (Microsoft Corporation, Redmond, Wash.) and Lotus Notes (IBM Corporation, Armonk, N.Y.).

When a participant dials into the system, the participant is recognized by the conferencing system by the telephone number from which they are calling or the manual entry of a personal user code. The system scans all conferences scheduled at or proximate to the present time of the call, finds all conferences in which this participant is invited to participate, allows the participant to select a conference to enter (if there are more than one that overlap or occur near that time of the call), confirms the name of the conference host, announces the new participant's presence, and places the participant into the conference.

Because the system has detailed information about each user from pre-registration, many aspects of the conferencing function are enhanced. When registering, a user can list the phone numbers from which they are likely to call (such as office, home, and mobile), so that the user is automatically identified when they call into the conferencing system. A user can select a unique "user code" that can be entered to identify himself when calling from other locations (such as a pay phone). The conference organizer does not need to provide any of this identifying information for the individual participants; they provide that information themselves. The conference system only needs to know from the organizer the participants' E-mail addresses.

A conference organizer can store preferences for which specific conference features will be enabled, and can invoke extra security measures, for example, for some or all of the conferences hosted by the organizer. On-line displays of participants, as well as conference billing summaries, can include details on each of the participants. Recurring conferences (daily, weekly, etc.) can be established. Reminder E-mail notices can automatically be sent to each of the participants in advance of the conference.

In one embodiment, the conferencing system does not require that all participants be registered users. If desired, a conference organizer can request a traditional conference code that can be entered by non-registered participants to access a particular conference.

Embodiments according to the identity-based conferencing system of the present invention rely on a relational database that stores information about users and conferences. Users can view and update the database via a Web browser interface. When callers dial into the system to join a conference, information is retrieved from the database to identify the participant and to determine in which conference they belong. Audio recordings are indexed by the database, and individual call records are stored for billing purposes.

Figure 2:
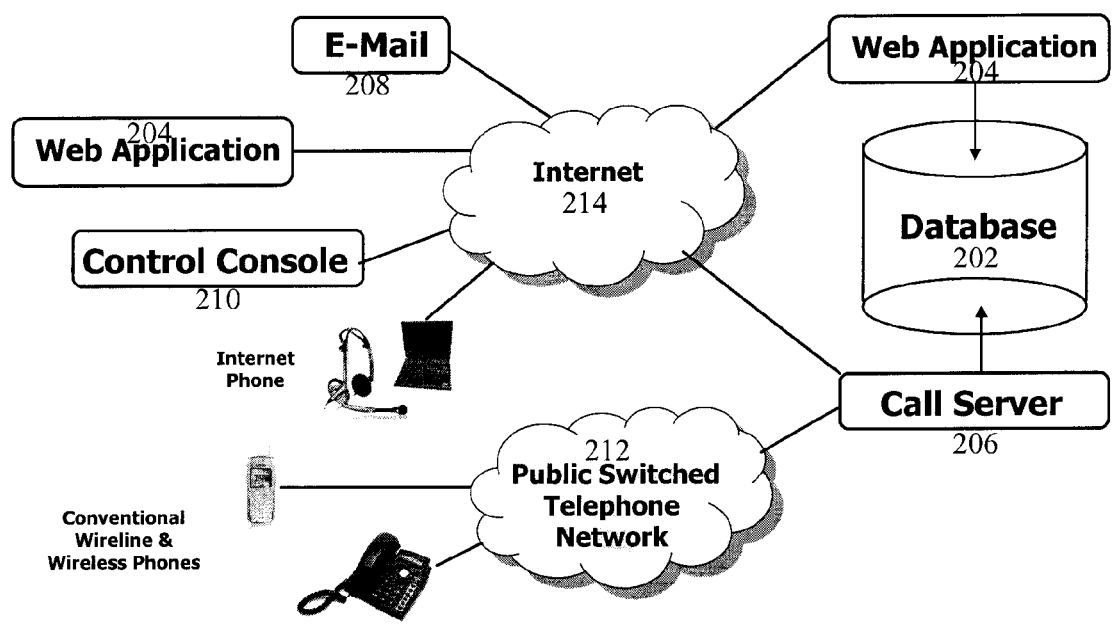
FIG. 2 is an exemplary overview illustration of a system according to an embodiment of the present invention.

Elements according to a system embodiment of a conferencing system according to the present invention as shown in FIG. 2. include the database 202, a web application 204, and a call server 206. In one embodiment, these elements are comprised of software running on a standard computer platform such as those described in relation to FIGS. 1a and 1b. However, the nature of the architecture allows the functions to be separated and run on multiple computers, thereby allowing for larger scale. Specialized conference-specific electronics can also be employed to provide for even more participants and larger conferences.

Database. As described above, FIG. 2 is an embodiment of a conferencing system according to the present invention. The database 202 as shown in FIG. 2 uses conventional off-the-shelf database technology such as, for example, Oracle (Oracle Corporation, Redwood Shores, Calif.) or mySQL (mySQL, Inc., Cupertino, Calif.). The database 202 can be a single database that is organized to store information regarding both user identities and conferences, or it can be comprised of multiple databases. Information contained within the database 202 includes a user identity. A user identity contains information to identify the user, to bill the user for conferencing services, and to store the user's preferences for conferencing operations. Items stored can include one or more E-mail addresses, one or more telephone numbers (such as an office phone number, mobile telephone number, and home telephone number), first and last name, business affiliation, etc. A password protects user identity information against unauthorized viewing and modification. A user code assigned by the user allows the user to identify themselves to the system when it cannot identify him via other means. The user code can be numeric or alphanumeric. Billing information can include credit card information or billing address and instructions, and account balance and payment history records. Preferences can include time zone, additional security features, request for a reminder E-mail of upcoming conferences, request for a dial out connection when a conference to which the user is invited starts, enabling of tones and announcements during the conference, and control of other features that might be offered by the call server element.

Conference information is comprised of data relevant to a specific conference. Conference data items stored can include the starting date and time of a conference, the planned duration of the conference, the E-mail addresses of all invited participants or other data items that identify participants, and the topic or title of the conference. One or more of the participants are designated as the conference host and can be identified in the conference information by a host user index. In one aspect, each conference is assigned a conference index. Specific features can also be enabled and disabled, such as additional security, recording, tones and announcements, etc. A conference code can be assigned so that callers that lack a user identity can still access the conference. In one aspect, the conference can be specified to recur on a regular (daily or weekly) basis. A link to the conference creator can be used to track billing information. Once a conference has concluded, details of the conference can be stored for billing and historical purposes.

The E-mail address lists in the user identity and the conference information are used to establish the relationships between the two sets of records. Given a specific set of conference information, the participants for that conference can be determined. Given a specific user identity, the user's associated E-mail addresses can be used to find all the past and planned conferences where they are listed as a participant. For instance, as shown in FIG. 4C users' E-mail addresses can be associated with, for example, an E-mail index. The E-mail index can be associated with a conference index as shown in FIG. 4E, which can be used to provide information about past and future conferences and those that participated or have been invited to participate in such conferences.

It is to be appreciated that user identity information is specific to the user, and not to any particular conference. This means that the conference organizer is not burdened with entering any participant-specific information (such as phone numbers or PIN codes); only the E-mail address is required (and this is normally used anyway to distribute notification of the call). The user need only enter this information once, and it will be used for all of the conferences in which he participates.

Web Application. A user accesses a web application 204 via a browser such as, for example, Microsoft's Internet Explorer (Microsoft Corporation, Redmond, Wash.), Netscape (AOL LLC, Dulles, Va.), Firefox (Mozilla.org), etc. in order to establish, view and update user identity and conference information.

Figure 3C:
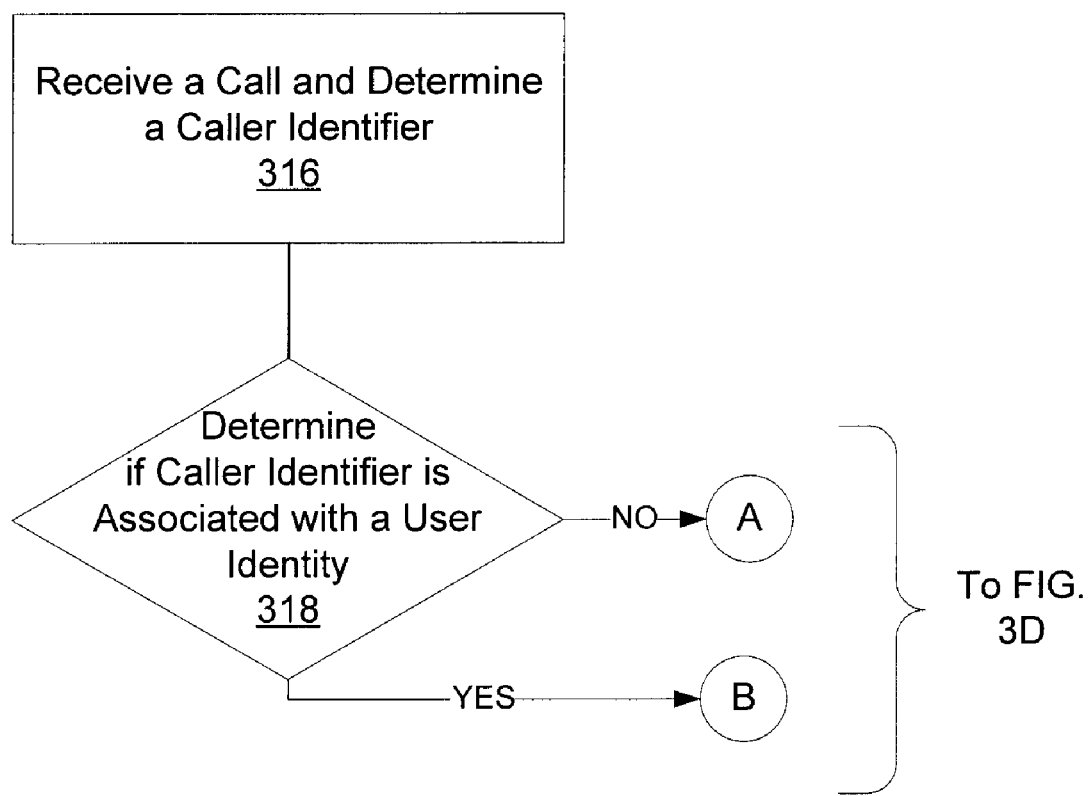
FIGS. 3C and 3D illustrate an exemplary process for management of calls received by an embodiment of the conferencing system according to the present invention.

The exemplary flowchart of FIGS. 3A-3C illustrate a process for conferencing according to an embodiment of the present invention. FIG. 3A illustrates a process for establishing a user identity for persons that may participate in a conference according to an embodiment of the present invention. The process starts at step 300. At step 302, a new user can create a user identity by supplying data items that can include at least an E-mail address. At step 304, the data items are verified. For instance, the web application 204 creates the user identity and sends an E-mail to the designated address in order to verify that the user is the real owner of that address. The user selects (e.g., clicks on) a unique code supplied by the system in the E-mail to be taken back to the web application in a "verified" state, from which the user can fill in the rest of the user identity data. The web application 204 can also verify phone numbers entered by the user. This can be accomplished by the system calling the supplied number, and asking that the user enter their assigned user code via the dial pad (DTMF). This ensures that the user really "owns" the telephone numbers listed in their user identity. According to one aspect, the web application 204 prompts the user to state their name or other identifying information (e.g., title, organization, location, etc.) into a microphone associated with the user's computer, and an audio recording of the stated information is stored in the record. The user identity information is stored in a database as known in the art. One structure that can be used for storing user identity information is shown in FIG. 4A, according to an embodiment of the present invention, though other structures are contemplated within the scope of this invention.

FIG. 3B illustrates a process for inviting participants to join in a conference. The process starts at step 305. Step 306 illustrates a conference scheduling activity. In one embodiment, a conference is scheduled by a user logging into the web application 202 and choosing, for example, a hyper-link or an icon or other selection means, to create a new conference and supplying conference information. The user supplies information about the conference (e.g., start time, end time, participant list, billing information, etc.) and the conference record is established in a database. Appropriate relationships are established in the database between the conference record, the conference creator, and the invited participants. For instance, a relational database structure as shown in FIGS. 4A-4E can be used to establish the relationships among conferences, the conference host, and participants.

According to one embodiment, the web application 204 is also provided with an E-mail interface 208, allowing it to receive E-mails. As an alternative to creating a new conference by host-entered information as just described, a user can send an E-mail to the web application containing the conference information. If the user uses a popular calendaring program such as, for example, Microsoft Outlook Calendar (Microsoft Corporation, Redmond, Wash.) or Lotus Notes (IBM Corporation, Armonk, N.Y.), this can be accomplished by including the web application's E-mail address on, for example, the meeting invitee list, or the carbon copy (cc:) or blind carbon copy (bcc:) line of the meeting notice that is sent to the other (human) participants in the conference, though it is contemplated that the E-mail notice can be sent directly to the web application as well (i.e., in the "To:" line of an E-mail). Regardless of the mode of addressing the E-mail, when the web application receives this E-mail it recognizes the "from" E-mail address as the creator and host of the conference. The E-mail addresses listed on the "to" line are the other participants. The "subject" of the E-mail is the conference topic, and the application can extract from the calendar notice the meeting start time and duration. The Internet Engineering Task Force has also standardized the "iCalendar" message format in RFC 2445, which provides a standardized method for exchanging meeting notifications and from which all of the aforementioned data items can be readily extracted. RFC 2445 is hereby incorporated by reference in its entirety.

At step 308, it is determined whether each of the participants is registered with the system (i.e., whether there is a user identity in the database 202 for that participant.) If the invited participant has a user identity, then the invitation process ends at step 314 for that participant. In some cases; however, participants invited into a new conference will not be registered with the system—that is, their E-mail addresses or other data items will not be listed in any user identity. If not recognized, and to encourage use of the system and give all participants the benefits, at step 310 the web application 204 can request the user to have a user identity created. At step 312, the web application tentatively creates a user identity for each of these participants and notifies them of this by sending an E-mail. The E-mail includes a link on which they can click to finish the sign-up process and provide the rest of the information required to complete their user identity record. Billing information is not required to participate in a conference created by someone else; this information is only necessary if they want to create their own conferences. The process then goes to step 314 where the participant invitation process ends for that participant. If the user does not follow the link and provide the necessary data, their user identity will be inoperative; however, the user is not precluded from participating in a conference.

The web application 204 can also use its E-mail interface, in conjunction with a conventional scheduling program such as, for example, Cron (a service included in Unix operating system software), to send to participants reminder notices of upcoming conferences.

Call Server. The call server 206 interacts with users over the telephone or Internet and accesses the database 202 to properly identify users and initiate and terminate conferences. In one embodiment, the call server sits outside the PSTN 212 and is connected to the network via access lines such as T-1, PRI, etc. Participants access the call server by dialing a single directory telephone number. Alternatively, the call server 206 could be installed by a telephone service provider within the PSTN 212. Also, in an embodiment, the call server 206 can be connected to provide conference services within an organization such as a company by interfacing the organizations telephone system and network with the call server 206. Within the call server are facilities to connect many different callers in numerous separate conferences (bridges). This technology is similar to that used by many existing conferencing services today.

Additionally, the call server 206 can be connected to the Internet 214 and can receive Voice-over-Internet Protocol (VoIP) calls initiated from computers with appropriate software or appropriately-equipped VoIP telephone sets, as are known in the art to one of ordinary skill.

The call server 206 comprises logic operating on its processor specific to the identity-based conferencing functionality. This logic can be contained within computer code accessible by the processor. The code can be stored in a memory associated with the call server 206.

Figure 3D:
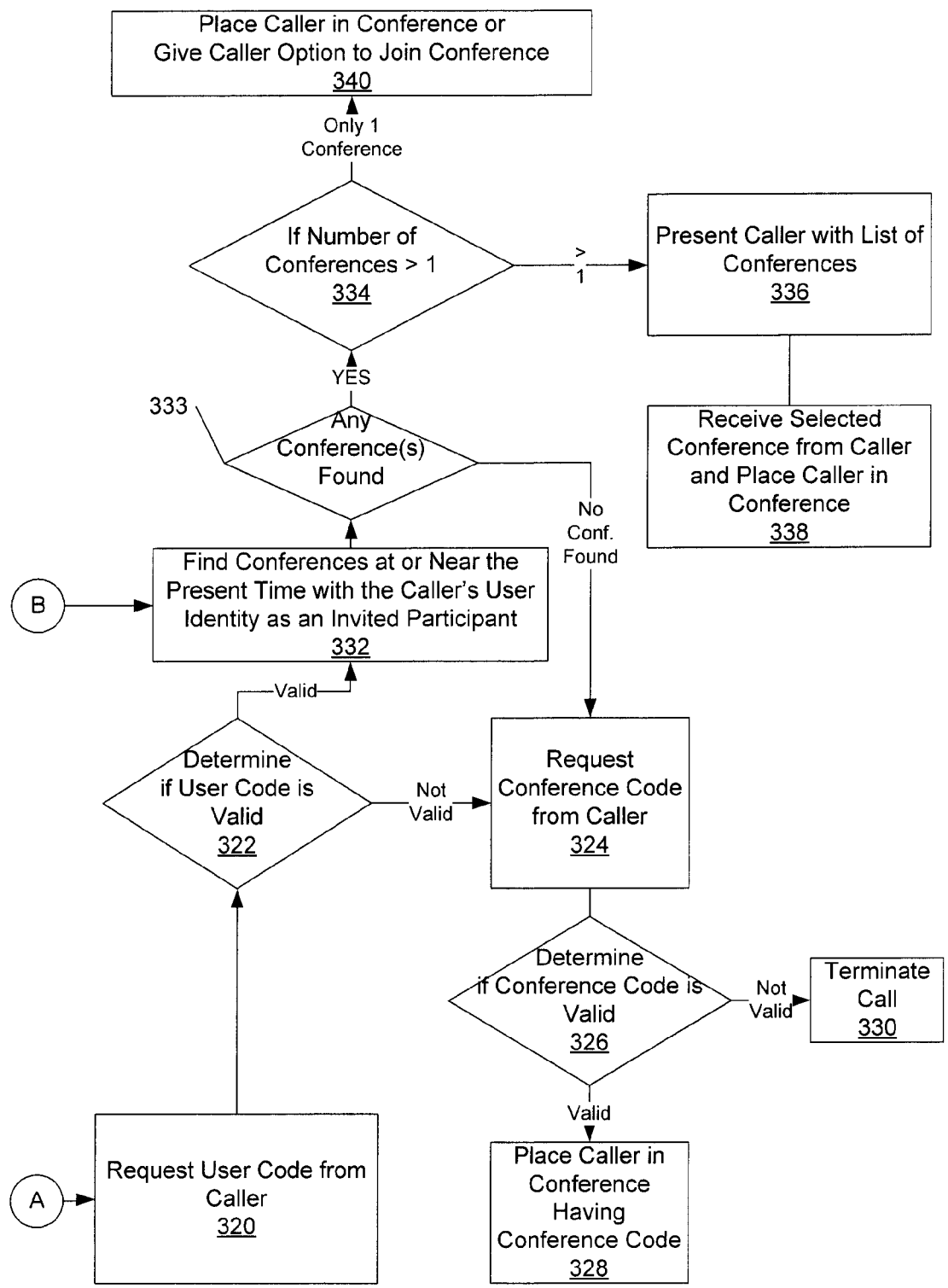

FIGS. 3C and 3D illustrate an exemplary process for management of calls received by an embodiment of the conferencing system according to the present invention. At step 316, a call is received by the call server 206 and a caller identifier is obtained. When a user calls via the PSTN 212, the call server 206 typically receives a caller ID, as known in the art, which indicates the number from which the caller is calling. (This is also sometimes referred to as Automatic Number Identification, or ANI, which while technically slightly different from caller ID, is functionally equivalent and either are equally applicable.)

At step 318, the call server 206 searches the database to find a user identity with which the caller ID is associated. If a user identity is found for the caller, the call server 206 can play the recorded audio information associated with a found user identity to confirm the identification. The process continues at step 332. If, at step 318, no user identity is found for the caller, then the process continues at step 320.

Returning to step 332, the call server 206 searches the database 202 for conferences scheduled at or near the current time (of the call) that are associated with the user identity. At step 333 it is determined whether any calls are found. At step 334, it is determined whether the user is invited to more than one conference occurring at substantially the same time or overlapping one another. If, at step 334, the call server 206 discovers that the user is invited to several different conferences that occur concurrently or overlap one another, then at step 336 it provides the user with a choice of conferences, and at step 338 the user can choose the conference in which to participate.

If, at step 334, the user is invited to participate in only one conference at or near the current time, then at step 340 the user is placed in that conference. In one embodiment, the call server plays the name of the host of each available conference and asks the user to pick one using the dial pad. If, at step 333, no conferences are found having the user's identity as a conference participant, the user is so informed and asked to enter a specific conference code at step 324 and the process goes to step 326 as described in greater detail further herein.

Returning to step 316, optionally the call server can identify callers in ways other than caller ID (or ANI). For instance, if the caller is connecting from a personal computer or other device using VoIP, the connection is often made using the Session Initiation Protocol (SIP) which includes a Uniform Resource Identifier (URI). The caller can program the URI to contain the user code stored in the user identity record, allowing the call server to make the identification by parsing the URI. Alternatively, the call server provides for a user name and password exchange, and this can be used to allow the user to program their telephony device or software to provide the same E-mail address and password that they use to log into the web application, again allowing the call server to identify the caller. Other fields in the SIP message can similarly be used at the discretion of the implementer. Using such technology, in one aspect, at step 336 the user can be provided a list of the multiple conferences (e.g., E-mail via the Internet or a web page listing conference selections), and at step 338 allowed to selectively choose one of the conferences in which to participate.

Returning now to step 318, if, at step 318, the call server cannot identify the caller with any of the above-described automated techniques, at step 320 it asks the user to enter a user code using the dial pad.

If, at step 322, the caller cannot be identified (e.g., the user code is not valid), or if once identified, the call server cannot find any scheduled conferences for that user, it offers the caller the opportunity to enter a conference code at step 324. At step 326 it is determined whether a match is found for that conference code and, if so, at step 328 the caller is placed into the appropriate conference; otherwise, at step 330 the caller is disconnected.

In one embodiment, the call server 206 also provides support for a control console 210 via the web. From a browser, a user can access the call server 206 and provide credentials analogous to those used to enter a conference. The call server 206 presents conference status information to the user, showing the callers currently participating in the conference. Information presented can include, for example, first and last names, organizational affiliation, and time on the call. If the appropriate features are enabled in the conference and user Identity records, the user can act on individual participants (for example, to mute or un-mute them, or disconnect them). The call server 206 also displays if a participant has indicated that he wants to ask a question.

Accordingly, while operable with only one or a few registered users, it is apparent that the system works best when there are a large number of registered users in a single system. If every conference were scheduled through this system and every participant were registered, everybody in the world could just call one number for all of their conferences. Of course, while this would be attractive for an operator of such a universal service, it is in fact unlikely, as competitive forces permit (and practically demand) numerous service providers to operate successfully. But the system described here is amenable to "federation," wherein separate systems communicate with each other to share identity information. So, for example, a host scheduling a conference with Service Provider A (SP A) might include a participant not registered in the "A" database. SP A contacts other service providers, to see if any of them have that individual registered. If the individual were found in the database of Service Provider B (SP B), systems SP A and SP B could exchange data such that the individual could access the SP A conference through the SP B system.

EXAMPLE

FIGS. 4A-4E illustrate an exemplary database structure according to an embodiment of the present invention. In this example, the tables of FIGS. 4A-4E are populated by users via a web application, such as those previously described herein. In the exemplary database structure shown, three conferences are scheduled. For example, referring initially to FIG. 4D, Fred is hosting two conferences and Dawn is hosting a third. Per FIG. 4E, David is listed as a participant in all three conferences.

Referring to FIG. 4B, David and Dawn are associated with two telephone numbers each. Fred is associated with one telephone number. Referring to FIG. 4C, David is associated with two E-mail addresses; Dawn and Fred are each associated with one E-mail address. It is to be appreciated that the database can contain additional information for users (e.g., preferences), and conferences (e.g., recurrence and billing information), which is not shown in FIGS. 4A-4E for clarity.

Figure 5:
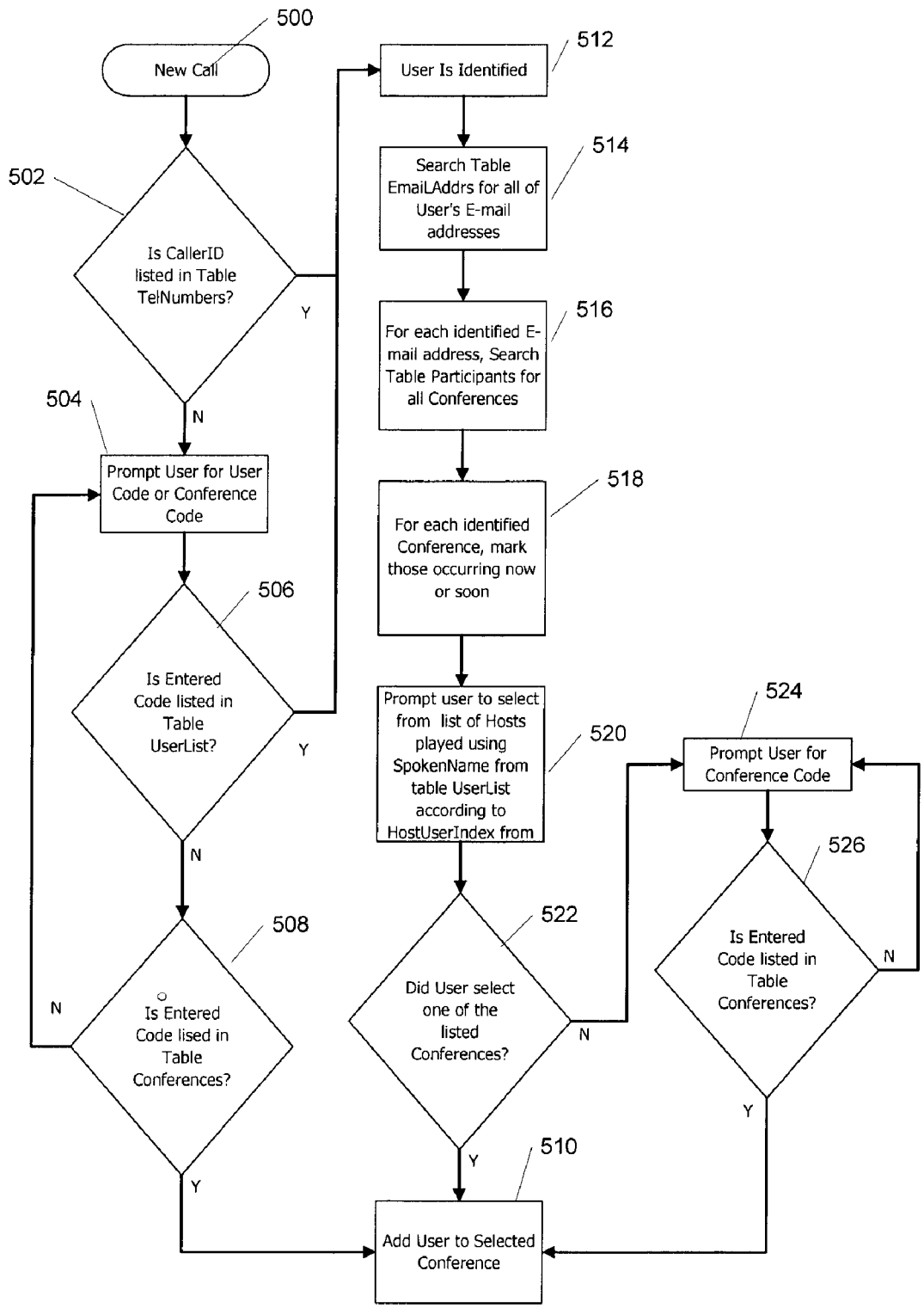
FIG. 5 is a flowchart illustrating an exemplary process of providing conference services in an embodiment according to the present invention.

As an example, David calls into the conferencing system according to an embodiment of the invention at 8:28 a.m. on December 15. The system identifies him from his caller ID (e.g., 408-555-5396). He is scheduled for both an 8:00 a.m. conference (he's 28 minutes late), and an 8:30 a.m. conference (he's two minutes early). The conferencing system according to this embodiment gives him an option of joining the conference hosted by Dawn or the one hosted by Fred. This process is further illustrated in the exemplary flowchart of FIG. 5.

At step 500, a new call is received by the conferencing system. At step 502, it is determined whether the caller ID of the new call is found in the TelNumbers Table (FIG. 4B).

If, at step 502, the caller ID is not found, then at step 504 the user is prompted for a user code or conference code. At step 506 it is determined whether the code received by the system is in the UserList Table (FIG. 4A). If not, then at step 508 it is determined whether the received code is in the Conferences Table (FIG. 4D). If not, then the process returns to step 504, where the user is again prompted for a user code or conference code. If, at step 508, the received code is in the Conferences Table (FIG. 4D), then the user is added to the selected conference at step 510.

Returning to step 506, if the code received is listed in the UserList Table (FIG. 4A_, then the process goes to step 512 where the user is identified. Likewise, returning to step 502, if the caller ID is listed in the TelNumbers Table (FIG. 4B), then the process goes to step 512 where the user is identified.

At step 514, a search of the E-mailAddrs Table (FIG. 4C) is conducted for all of the user's associated E-mail addresses. At step 516, a search is performed of the Participants Table (FIG. 4E) conferences associated with the user's identified E-mail address(es). At step 518, for each identified conference found, they are marked as either occurring presently or soon. At step 520, the user is prompted to select a conference to participate in based on a list of hosts provided audibly using the SpokenName field from the UserList Table (FIG. 4A) according to the HostUserIndex field from the Conferences Table (FIG. 4D).

At step 522, it is determined whether the user selected one of the listed conferences. If so, then the user is placed in the selected conference at step 510. If not, then the user is prompted for a user code at step 524. At step 526 it is determined whether the received conference code is listed in the Conferences Table (FIG. 4D). If so, then the user is placed in the selected conference at step 510. If not, then the process returns to step 524 where the user is (again) prompted to enter a conference code. In one aspect, this process may eventually disconnect the user if they cannot provide identifiable information.

CONCLUSION

The above represents only a few examples of how a particular system might be implemented. There are numerous variations and additional features and capabilities that might be included in other variants.

The above examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention.

Throughout this application, various publications and/or standards may be referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of conferencing comprising:
   receiving by a conferencing system configured to concurrently host a plurality of conferences one or more user identities, wherein said user identity includes one or more data items that identify a user;
   receiving by said conferencing system conference information, wherein said conference information includes at least one of said data items for each conference participant and an anticipated start time;
   receiving by said conferencing system a call from a prospective conference participant and determining a caller identifier for the prospective conference participant from call data and a call time for said call;
   comparing the caller identifier to the data items in each said user identity to identify said prospective conference participant;
   comparing the caller identifier or the data items of an identified prospective conference participant to the conference data to determine one or more of said plurality of conferences in which the identified prospective conference participant is invited to participate; and
   if there is only one conference having said anticipated start time proximate to said call time in which the identified prospective conference participant is invited to participate, then placing said identified prospective conference participant in said conference or giving said identified prospective conference participant an option to enter said conference, else if there is more than one conference having start times proximate to said call time in which the identified prospective conference participant is invited to participate then;
      allowing said identified prospective conference participant to selectively choose any of said plurality of conferences in which the identified prospective conference participant is invited to participate.

2. The method of claim 1, wherein said data items that identify a user comprise one or more E-mail addresses or one or more telephone numbers.

3. The method of claim 1, wherein receiving by said conferencing system conference information of at least one of said data items for each conference participant comprises receiving at least one E-mail address for each conference participant.

4. The method of claim 1, wherein receiving by said conferencing system conference information, wherein said conference information includes at least one of said data items for each conference participant and an anticipated start time, comprises receiving said conference information via E-mail.

5. The method of claim 1, wherein comparing the caller identifier to the data items in each said user identity to identify said prospective conference participant further comprises receiving a user identity from said prospective conference participant that includes one or more data items that identify the prospective conference participant if said caller identifier is not found in the data items of each said user identity.

6. The method of claim 1, wherein the caller identifier is determined by caller ID or ANI.

7. The method of claim 1, wherein comparing the caller identifier or the data items of an identified prospective conference participant to the conference data to determine one or more of said plurality of conferences in which the identified prospective conference participant is invited to participate further comprises determining that said identified prospective conference participant is not invited to participate in any schedule conference and allowing said prospective conference participant into a conference by receiving a conference code from said prospective conference participant.

8. A system for providing conferencing services comprising:
- a memory configured for storing data related to a plurality of users and a plurality of conferences;
- a processor, coupled to the memory, wherein the processor is configured for performing the steps comprising:
  - receiving by a conferencing system configured to concurrently host a plurality of conferences one or more user identities, wherein said user identity includes one or more data items that identify a user;
  - receiving by said conferencing system conference information, wherein said conference information includes at least one of said data items for each conference participant and an anticipated start time;
  - receiving by said conferencing system a call from a prospective conference participant and determining a caller identifier for the prospective conference participant from call data and a call time for said call;
  - comparing the caller identifier to the data items in each said user identity to identify said prospective conference participant;
  - comparing the caller identifier or the data items of an identified prospective conference participant to the conference data to determine one or more of said plurality of conferences in which the identified prospective conference participant is invited to participate; and
  - if there is only one conference having said anticipated start time proximate to said call time in which the identified prospective conference participant is invited to participate, then placing said identified prospective conference participant in said conference or giving said identified prospective conference participant an option to enter said conference, else if there is more than one conference having start times proximate to said call time in which the identified prospective conference participant is invited to participate, then;
  - allowing said identified prospective conference participant to selectively choose any of said plurality of conferences in which the identified prospective conference participant is invited to participate.

9. The system of claim 8, wherein said data items that identify a user comprise one or more E-mail addresses or one or more telephone numbers.

10. The system of claim 8, wherein receiving by said conferencing system conference information of at least one of said data items for each conference participant comprises receiving at least one E-mail address for each conference participant.

11. The system of claim 8, wherein receiving by said conferencing system conference information, wherein said conference information includes at least one of said data items for each conference participant and an anticipated start time, comprises receiving said conference information via E-mail.

12. The system of claim 8, wherein comparing the caller identifier to the data items in each said user identity to identify said prospective conference participant further comprises receiving a user identity from said prospective conference participant that includes one or more data items that identify the prospective conference participant if said caller identifier is not found in the data items of each said user identity.

13. The system of claim 8, wherein the caller identifier is determined by caller ID or ANI.

14. The system of claim 8, wherein comparing the caller identifier or the data items of an identified prospective conference participant to the conference data to determine one or more of said plurality of conferences in which the identified prospective conference participant is invited to participate further comprises determining that said identified prospective conference participant is not invited to participate in any schedule conference and allowing said prospective conference participant into a conference by receiving a conference code from said prospective conference participant.

* * * * *